Jan. 11, 1966  S. ZEMAN  3,228,191
TEMPERATURE CONTROLLED IGNITER
Filed May 25 1964  2 Sheets-Sheet 1

Samuel Zeman INVENTOR.

BY

ATTORNEY

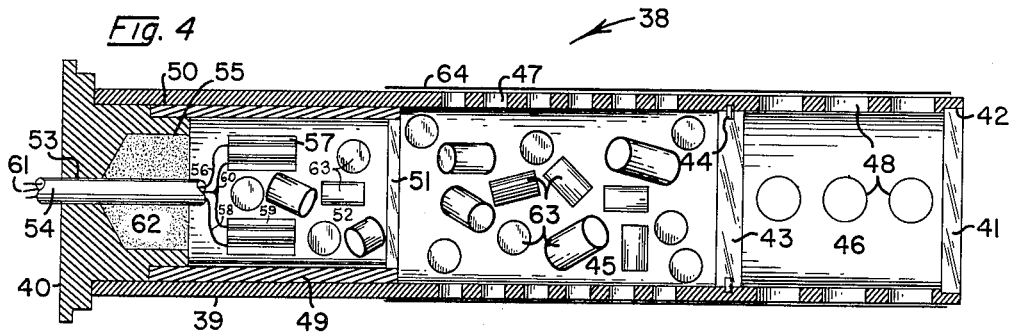
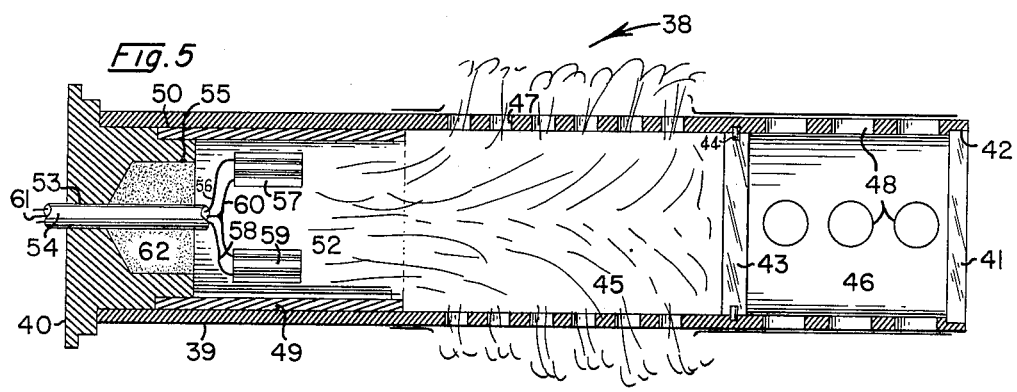
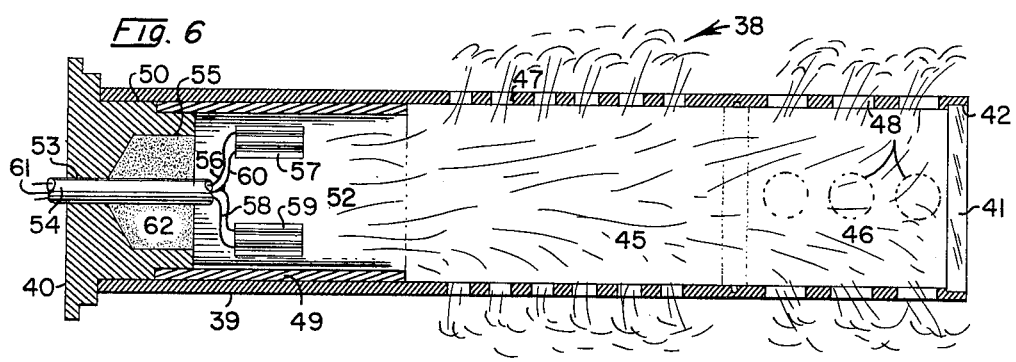

United States Patent Office 3,228,191
Patented Jan. 11, 1966

3,228,191
TEMPERATURE CONTROLLED IGNITER
Samuel Zeman, Huntsville, Ala., assignor to Thiokol Chemical Corporation, Bristol, Pa., a corporation of Delaware
Filed May 25, 1964, Ser. No. 369,726
4 Claims. (Cl. 60—39.82)

This invention relates to improvements in temperature controlled igniters and, more particularly, to an igniter wherein the amount of the surface area of the pyrotechnic material in the igniter that is committed to combustion is controlled by the temperatures of the solid propellant in a solid propellant rocket motor.

In igniters of this type, some control of the burning surface area of the pyrotechnic material in the igniter must be obtained; for it is the amount of surface area that is subjected to combustion that determines the ignition energy that is furnished to a solid propellant rocket motor by the igniter at a given time.

One of the procedures for controlling the amount of energy that is released at a given time is embodied in the present invention and comprsies the use of a compartmentalized or segmented igniter. By dividing the body of the igniter into two or more compartments and isolating these compartments so that the ignition of each compartment can be controlled at will, the rate at which energy is delivered to the solid propellant rocket motor can thus be controlled.

It is an object of the invention, therefore, to provide a compartmentalized or segmented igniter having means incorporated therein whereby the compartments or segments may be isolated so that ignition of the compartments may be initiated at will to control the energy delivered by the igniter to a solid propellant rocket motor.

Initiation of the pyrotechnic material in the igniter can be accomplished by the inclusion of temperature sensitive switches which will energize the ignition circuits for the igniter according to the temperature of the pyrotechnic material within the igniter and the temperature of the solid propellant in a solid propellant rocket motor.

The ignition of the pyrotechnic material in the igniter is accomplished through the medium of electrically-actuated squibs; and the controlled energizing of such squibs will control the amount of the pyrotechnic material in the igniter that is committed to combustion at a given time and hence control the rate of energy that is released. Although that portion of pyrotechnic material which is not ignited by electrically-actuated squibs may ultimately be consumed, its output will be out-of-phase with the squib ignited portion.

It is, therefore, another object of the invention to provide an igniter having temperature controlled switches installed therein that are connected to the ignition initiators for the squib so that, under the influence of temperature changes, the temperature controlled switches will energize the ignition initiator to ignite the pyrotechnic material in the igniter as required by temperature changes that affect the solid propellant in a solid propellant rocket motor.

The present invention contemplates dividing the igniter first into two compartments and putting an ignition initiator in each compartment. A small bi-metallic thermostat would be connected in series with one of the initiators and positioned within the igniter would open the electrical circuit to one initiator, for example, when the temperature exceeds 100° F. Thus, the initiators would both fire at low temperatures, but only one would fire at high temperatures.

It is, therefore, still another object of the invention to provide temperature controlled switches in the igniter that, under the influence of temperature changes, will control the energizing of the initiators in the igniter.

A modified form of igniter is also contemplated by the present invention wherein all of the initiators are placed in one of the compartments and providing a burst diaphragm in the igniter that is ruptured at high temperature ranges so that the venting area of the igniter is increased to control the energy output rate of the igniter.

It is, therefore, a still further object of the invention to provide excessive venting areas for the igniter, the restriction of which is controlled by the temperature ranges affecting both the pyrotechnic material in the igniter and the solid propellant in the solid propellant rocket motor.

With the above and other objects and advantages in view, the invention consists of the novel details of construction, arrangement and combination of parts more fully hereinafter described, claimed and illustrated in the accompanying drawings in which:

FIGURE 4 is a longitudinal sectional view of a modified form of the igniter in pre-ignition condition.

FIGURE 5 is a similar view to FIGURE 4 showing the ignition of the igniter at high temperatures, and FIGURE 6 is a similar view to FIGURE 4 showing the ignition of the igniter at low temperatures.

Figure 1:
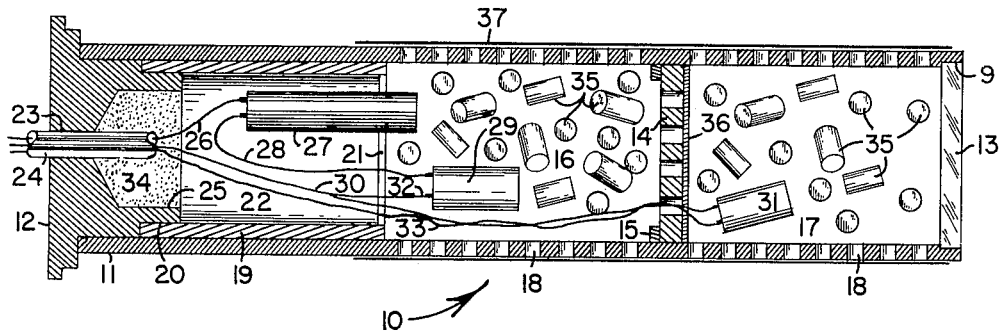
FIGURE 1 is a longitudinal, sectional view of an igniter embodying the invention in pre-ignition condition.
Figure 2:
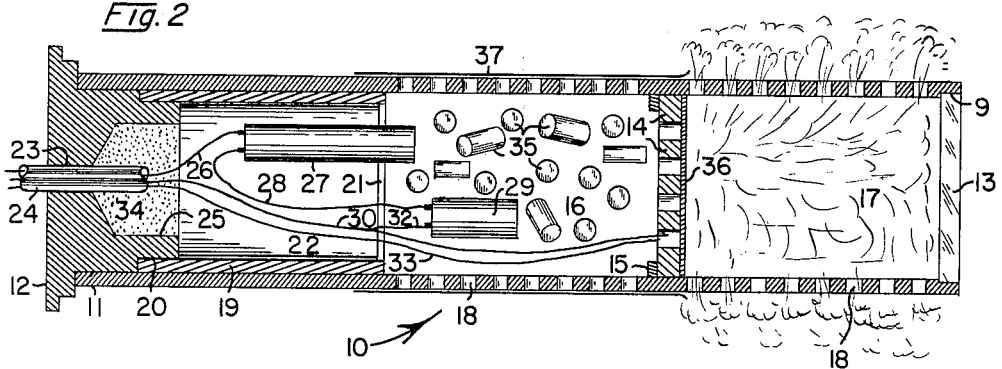
FIGURE 2 is a similar view to FIGURE 1 showing the ignition of the igniter at high temperatures.
Figure 3:
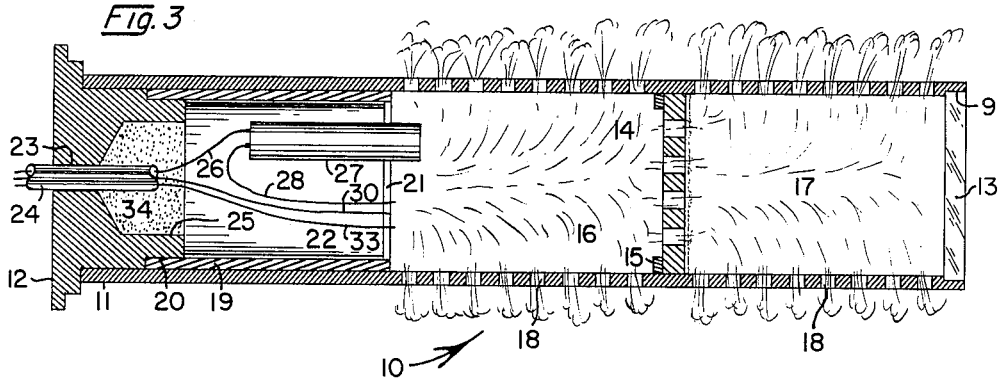
FIGURE 3 is a similar view to FIGURE 1 showing the ignition of the igniter at low temperatures.

Referring more in detail to the drawings and, more particularly, to FIGURES 1 to 3 inclusive wherein one form of the invention is illustrated and like parts are designated by like reference numerals, the reference numeral 10 is used to generally designate one form of the igniter embodying the invention.

In this form of the invention, the igniter 10 comprises a tubular metal or plastic body 11 having a metal adapter plug 12 rigidly secured to one end thereof and a disc plug 13 rigidly secured in an annular internal seat 9 in the opposite end thereof. The adapter plug 12 is used to mount the igniter 10 in the conventional manner in the motor case of a solid propellant rocket motor.

A perforated disc 14 is rigidly secured in position within the tubular body 11 and projections 15 integral with the interior wall surface of the tubular body 11 limits the inward movement of the disc 14 and properly positions it in the tubular body 11. The disc 14 separates the tubular body 11 into two compartments 16 and 17 respectively, and that portion of the tubular body 11 that defines the walls of the compartments 16 and 17 is provided with a plurality of equally-spaced venting ports 18.

The adapter plug 12 may be made of one piece or it may include a sleeve 19 that is positioned in an annular seat 20 that is formed in the external surface of the inner end of the adapter plug 12, as shown in the figures. A disc 21 is rigidly secured in the inner end of the sleeve 19 and provides a third compartment 22 in the tubular body 11 of the igniter 10.

The adapter plug 12 is provided in the outer end thereof with an opening 23 through which a wiring harness 24 extends into a cavity 25 in the center of the adapter plug 12. One of the conductor wires 26 of the wiring harness 24 is connected to one pole of a small bi-metallic thermostatic switch 27 that is primarily located in the compartment 22 but extends through the disc 21 to terminate in the compartment 16. The opposite pole of the bi-metallic thermostatic switch 27 is connected by a conductor wire 28 to one pole of an electrically-operated initiator 29 that is positioned in the compartment 16; and a second conductor wire 30 of the wiring harness 24 is connected to one pole of an electrically-operated initiator 31 in the compartment 17 and to a conductor wire 32 that is connected to the opposite pole of the electrically-actuated initiator 29, a third conductor wire 33 of the wiring harness 24 being connected to the opposite pole of the electrically-actuated initiator 31, as shown in FIGURE 1. The conductor wires extend through the plug 21 and the perforations in the disc 14.

Potting material 34 may be only positioned in the cavity 25 in the adapter plug 12, as shown, or it may be used to completely fill the compartment 22, as desired. Pelletized pyrotechnic material 35 is used to completely fill both of the compartments 16 and 17; and a diaphragm 36 contacts the perforated disc 14 to seal off the compartments 16 and 17 until the igniter is put into operation, as will be later described.

The ported area of the tubular body 11 is closed by a thin-skinned thermal barrier and moisture seal 37 that prevents moisture from entering the tubular body 11 and destroying the effectiveness of the pelletized pyrotechnic material 35.

In the operation of this form of the invention, the igniter 10 is assembled, as shown in FIGURE 1, and inserted into the opening in the end of a motor case for a solid propellant rocket motor, not shown. This is conventional practice, and it is not believed necessary to show the igniter mounted in a motor case.

Should the temperature range be high, it will affect the bi-metallic thermostatic switch 27 to open the circuit supplied by the wiring harness 24 to the electrically-actuated initiator 29.

Since the ignition requirements for solid propellant under high temperature ranges is low, only the electrically-operated initiator 31 will be actuated to cause ignition of the pelletized pyrotechnic material 35 in the compartment 17, as shown in FIGURE 2, under such high temperature ranges. However, at low temperature ranges, when the ignition requirements for solid propellant are high, the bi-metallic switch 27 will not operate and both of the electrically-actuated initiators 29 and 31 will be energized to simultaneously ignite the pelletized pyrotechnic material 35 in both of the compartments 16 and 17, as shown in FIGURE 3.

As shown in FIGURE 2, the diaphragm 36 will effectively seal the compartment 17 from the compartment 16 so that the hot gases formed by the ignition of the pelletized pyrotechnic material 35 in the compartment 17 will not affect or ignite the pelletized material 35 in the compartment 16; but when the pelletized material 35 in both compartments 16 and 17 are simultaneously ignited, as shown in FIGURE 3, the diaphragm 36 will be ruptured.

Thus, at high temperature ranges, the energy impulse of the igniter 10 is minimized, as shown in FIGURE 2; but at low temperature ranges, the energy impulse is at optimum operating condition, as shown in FIGURE 3. Consequently, the hot generated gases escaping through the venting ports 18 in the tubular body 11 under either low or high temperature ranges will ignite the solid propellant in the solid propellant rocket motor under all operating temperature ranges. Although the pyrotechnic material in compartment 16 will utimately burn after the rocket motor is ignited, advantageously, its pressure and thermal output will be out of phase with that of compartment 17 during the critical ignition process.

Referring more in detail to FIGURES 4 to 6 wherein a modified form of the invention is illustrated, the igniter 38 is seen to comprise a tubular metal or plastic body 39 having a metal adapter plug 40 rigidly secured to one end thereof and a disc plug 41 rigidly secured in an annular internal seat 42 in the opposite end thereof. The adapter plug 40 is used to mount the igniter 38 in the conventional manner in the motor case of a solid propellant rocket motor. A burst diaphragm 43 is secured in position within the tubular body 39 by means of shear pins 44. The burst diaphragm 43 separates the tubular body 39 into two compartments 45 and 46 respectively, and that portion of the tubular body 39 that defines the wall of the compartment 45 is provided with a plurality of equally-spaced venting ports 47 while that portion of the tubular body 39 that defines the wall of the compartment 46 is provided with a plurality of rows of equally-spaced venting ports 48 that are larger in diameter than are the venting ports 47.

The adapter plug 40 may be made of one piece or it may include a sleeve 49 that is positioned in an annular seat 50 that is formed in the external surface of the inner end of the adapter plug 40, as shown in the figures. A disc 51 is rigidly secured in the inner end of the sleeve 49 and provides a third compartment 52 in the tubular body 39 of the igniter 38.

The adapter plug 40 is provided in the outer end thereof with an opening 53 through which a wiring harness 54 extends into a cavity 55 in the center of the adapter plug 40. One of the conductor wires 56 of the wiring harness 54 is connected to one pole of an electrically-actuated initiator 57, while another conductor wire 58 is connected to one pole of an electrically-actuated initiator 59. The remaining poles of the electrically-actuated initiators 57 and 59 being interconnected by means of a conductor wire 60 which, in turn, is connected to a conductor wire 61 of the wiring harness 54. The electrically-actuated initiators 57 and 59 are positioned in spaced-parallel relation to each other in the compartment 52, and the cavity 55 is filled with a potting material 62.

Pelletized pyrotechnic material 63 is used to completely fill both of the compartments 45 and 52, and the compartment 46 remains empty to function as an expansion chamber for a purpose to be later described.

The ported area of the tubular body 39 is closed by a thin-skinned thermal barrier and moisture seal 64 that prevents moisture from entering the tubuar body 39 and destroying the effectiveness of the pelletized pyrotechnic material 63.

In the operation of this form of the invention, the igniter 38 is assembled, as shown in FIGURE 4, and inserted into the opening in the end of a motor case for a solid propellant rocket motor, not shown.

The principle of operation of this form of the igniter 38 is that, at high temperature ranges, the internal pressure within the igniter 38 will be high enough to rupture the burst diaphragm 43, thus increasing the venting area of the tubular body 39 so the compartment or expansion chamber 46 will now be open to the compartment 45, and the ports 47 and 48 will be simultaneously opened to the interior of the rocket motor.

Since the energy output rate of the igniter 38 is controlled by the ported area, any increase in the ported area will reduce the burning rate of the pyrotechnic and hence the heat flux of the igniter 38. Thus, as shown in FIGURE 5, the electrically-actuated initiators 57 and 59, when actuated, will ignite the pelletized material 63 in both of the compartments 45 and 52. When the ignition requirements for the solid propellant are high, at low temperatures, the energy output rate for the solid propellant will be at its highest due to the fact that the burst diaphragm 43 will not rupture, and the igniter 38 will vent only through ports 47. But when high temperature ranges are in effect and the pressure within the igniter 38 has ruptured the burst diaphragm 43, the energy output rate of the igniter 38 will be at its lowest when the ignition requirements for the solid propellant are at their lowest. The ignition and energy output rate requirements are, therefore, balanced—which balancing can not be achieved in igniters of conventional structure.

Both forms of the invention are affected by high and low temperature ranges, both have compartmentalized bodies and each include pyrotechnic material therein—the burning mode of which is determined by high and low temperature ranges.

It is believed that, from the foregoing description, the manner of operation and the construction of both forms of the igniter will be apparent to those skilled in the art; and it is to be understood that variations in the mode of operation and the construction of both forms of the igniter may be adhered to providing that such variations fall within the spirit of the invention and the scope of the appended claims.

Having thus described the invention, what is claimed as new and desired to be secured by Letters Patent is:

1. A temperature controlled igniter comprising a tubular body, means in said body for dividing said body into a plurality of compartments, pyrotechnic material in each of two adjacent compartments, means positioned in each of said two adjacent compartments for igniting said pyrotechnic material, and temperature controlled means extending into one of said two adjacent compartments for igniting said pyrotechnic material in one or both said compartments, depending on the temperature range affecting said igniter.

2. A temperature controlled igniter, as in claim 1, wherein said igniting means comprises electrically-actuated initiators.

3. A temperature controlled igniter, as in claim 1, wherein said temperature controlled means comprises a bimetallic thermostatic switch.

4. A temperature controlled igniter, as in claim 1, wherein an adapter plug for mounting said igniter in a rocket motor case is used to close one end of said body and a disc plug is used to close the opposite end of said body.

References Cited by the Examiner
UNITED STATES PATENTS
2,990,683   7/1961   Walden _____ 60—39.82 X MARK NEWMAN, *Primary Examiner.*
RALPH D. BLAKESLEE, *Examiner.*